(12) United States Patent
Park et al.

(10) Patent No.: US 11,876,452 B2
(45) Date of Patent: Jan. 16, 2024

(54) VOLTAGE DELAY COMPENSATION IN A BUCK CONVERTER

(71) Applicant: Samsung Electronics Co., Ltd., Suwon-si (KR)

(72) Inventors: Jeongpyo Park, Seoul (KR); Taehwang Kong, Suwon-si (KR); Junhyeok Yang, Seoul (KR); Donghoon Jung, Hwaseong-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 110 days.

(21) Appl. No.: 17/477,813

(22) Filed: Sep. 17, 2021

(65) Prior Publication Data
US 2022/0190720 A1 Jun. 16, 2022

(30) Foreign Application Priority Data
Dec. 16, 2020 (KR) ........................ 10-2020-0176128

(51) Int. Cl.
*H02M 3/158* (2006.01)
*H02M 1/15* (2006.01)
*H02M 1/00* (2006.01)

(52) U.S. Cl.
CPC ......... *H02M 3/158* (2013.01); *H02M 1/0016* (2021.05); *H02M 1/15* (2013.01)

(58) Field of Classification Search
CPC .................................. H02M 3/155–1588
See application file for complete search history.

(56) References Cited

U.S. PATENT DOCUMENTS 9,762,121 B2   9/2017  Lakkimsetti et al.
9,847,718 B2   12/2017 Sturcken et al.
(Continued)

FOREIGN PATENT DOCUMENTS

JP   H08-186977 A    7/1996
JP   2008-125165 A   5/2008
(Continued)

OTHER PUBLICATIONS

Seong Joong Kim, et al. "High Frequency Buck Converter Design Using Time-Based Control Techniques" IEEE Journal of Solid-State Circuits, vol. 50, No. 4, Apr. 2015.
(Continued)

*Primary Examiner* — Peter M Novak
(74) *Attorney, Agent, or Firm* — Harness, Dickey & Pierce, P.L.C.

(57) ABSTRACT

A DC-DC converter including a switching buck regulator including a first power switch connected to a first power node, a second power switch connected to a second power node, a driver configured to drive the first and second power switches, an output filtering inductor connected to a node between the first and second power switches, and an output filtering capacitor connected to the output filtering inductor, a controller configured to compensate for an output signal of the switching buck regulator in a time domain using a reference voltage, and a feed forward circuit connected between the switching buck regulator and the controller, and including a first buffer, a second buffer, an RC filter, and an adder may be provided. Accordingly, the DC-DC converter can reduce a delay of a compensation circuit, improve transient response characteristics of the switching buck regulator, and further improve the performance of the DC-DC converter.

19 Claims, 12 Drawing Sheets

(56) References Cited

U.S. PATENT DOCUMENTS

2008/0024104 A1 1/2008 Yamada
2021/0384830 A1* 12/2021 Bertolini ............... H02M 3/158

FOREIGN PATENT DOCUMENTS

JP        2009-118691 A   5/2009
KR        10-1043580 B1   3/2011

OTHER PUBLICATIONS

Jin-Gyu Kang, et al. "A Time-Domain-Controlled Current-Mode Buck Converter With Wide Output Voltage Range" IEEE Journal of Solid-State Circuits, vol. 54, No. 3, Mar. 2019.

* cited by examiner

VOLTAGE DELAY COMPENSATION IN A BUCK CONVERTER

CROSS-REFERENCE TO RELATED APPLICATION(S)

This application claims priority under 35 U.S.C. § 119 to Korean Patent Application No. 10-2020-0176128 filed on Dec. 16, 2020 in the Korean Intellectual Property Office, the disclosure of which is incorporated herein by reference in its entirety.

BACKGROUND

1. Field

The present inventive concepts relate to DC-DC converters.

2. Description of Related Art

A DC-DC converter is a circuit for boosting or stepping down a magnitude of a DC voltage applied to an input terminal to a voltage desired by a load and outputting the boosted or stepped-down DC voltage to an output terminal. The DC-DC converter is implemented to output a step-down voltage using a buck regulator including an inductor. Such a DC-DC converter is an essential component in manufacturing various information electronic devices. The DC-DC converter can operate in a time domain or in a voltage domain. When the DC-DC converter includes a compensation circuit for compensating for the output voltage, a transient response characteristic of the DC-DC converter related to the operation of the compensation circuit determines a performance of the DC-DC converter.

SUMMARY

An aspect of the present inventive concepts is to provide a DC-DC converter reducing a time taken for an output of a transient response to reach a normal state according to input voltage and load fluctuations, and furthermore, having improved transient response characteristics.

According to an aspect of the present inventive concepts, a DC-DC converter may include a switching buck regulator including a first power switch connected to a first power node for outputting a first power voltage, a second power switch connected to a second power node for outputting a second power voltage lower than the first power voltage, a driver configured to drive the first power switch and the second power switch, an output filtering inductor connected to a node between the first power switch and the second power switch, and an output filtering capacitor connected to the output filtering inductor, a controller configured to compensate for an output signal of the switching buck regulator in a time domain using a reference voltage, and a feed forward circuit connected between the switching buck regulator and the controller, and the feed forward circuit including a first buffer, a second buffer, an RC filter, and an adder, wherein an input terminal of the first buffer is connected to an output terminal of the switching buck regulator and the adder, and an output terminal of the first buffer is connected to the RC filter, and an input terminal of the second buffer is connected to the RC filter and the controller, and an output terminal of the second buffer is connected to the adder.

According to an aspect of the present inventive concepts, a DC-DC converter may include a switching buck regulator including a driver and configured to output a first output signal, the driver configured to drive a first power switch and a second power switch, a feed forward circuit connected to the switching buck regulator and including an adder, the feed forward circuit configured to generate a second output signal by performing a first operation on the first output signal, and output the first output signal and the second output signal using the adder, and a controller connected to the adder, the controller including a first voltage controlled oscillator, a second voltage controlled oscillator, a voltage controlled delay line, and a phase detector, wherein the controller is configured to convert the first output signal and the second output signal into a time domain, perform a second operation on the converted first output signal and the converted second output signal, and perform a third operation to compensate for on a signal on which the second operation has been performed.

According to an aspect of the present inventive concepts, a DC-DC converter may include a switching buck regulator including a driver configured to output a switching signal for driving a first power switch and a second power switch based on a driving signal, and the switching buck regulator configured to output a first output signal, a feed forward circuit connected to the switching buck regulator, the feed forward circuit including a first buffer, an RC filter, a second buffer, and an adder sequentially on a feed forward path, the feed forward circuit configured to output the first output signal together with a second output signal using the adder, and a controller including a voltage controlled delay line connected to a first voltage controlled oscillator, and a phase detector connected to a second voltage controlled oscillator, the controller configured to convert the first output signal and the second output signal into a time domain, and generated a driving signal based on at least one of the converted first output signal or the converted second output signal.

BRIEF DESCRIPTION OF DRAWINGS

The above and other aspects, features and other advantages of the present disclosure will be more clearly understood from the following detailed description, taken in conjunction with the accompanying drawings, in which.

DETAILED DESCRIPTION

Hereinafter, some example embodiments of the present inventive concepts will be described in detail with reference to the accompanying drawings.

It will be understood that when an element or layer is referred to as being "on," "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present.

Figure 1:
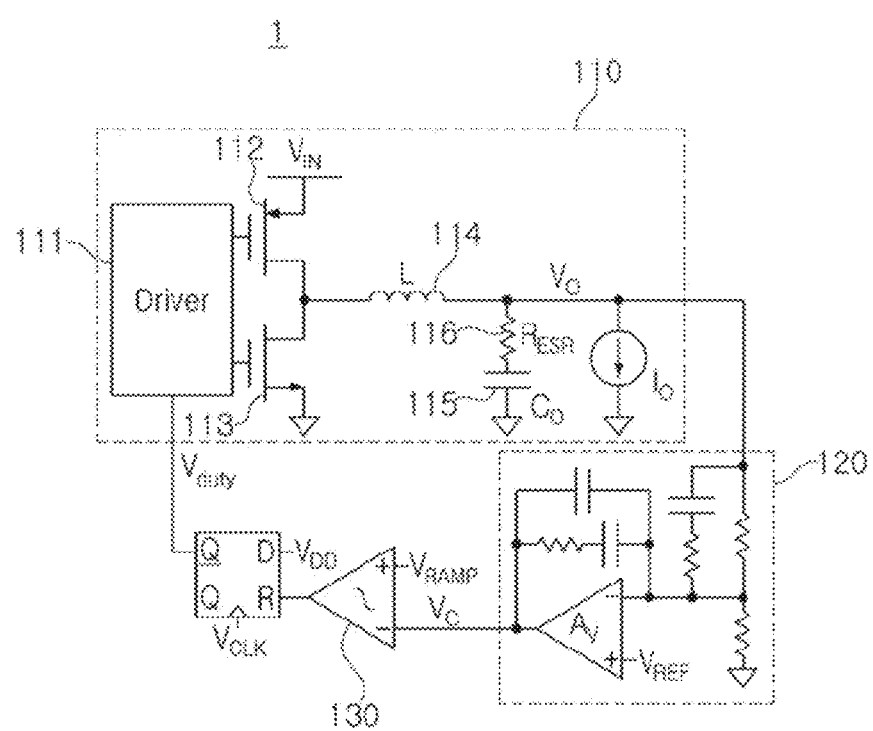
FIG. 1 is a circuit diagram of a general DC-DC converter including a PID controlled circuit.

FIG. 1 is a circuit diagram of a general DC-DC converter including a PID controlled circuit.

Referring to FIG. 1, a conventional DC-DC converter 1 may include a switching buck regulator 110. For example, the switching buck regulator 110 may change an output voltage transferred to a load according to a state in which a switch is contacted. For example, the switching buck regulator 110 may include a driver 111, a first power switch 112, a second power switch 113, an output filtering inductor L 114, and an output filtering capacitor Co 115.

The output filtering inductor 114 and the output filtering capacitor 115 may be connected in parallel with an equivalent parallel resistance, and the equivalent parallel resistance may be defined as an equivalent series resistance $R_{ESR}$ 116 connected in series with the output filtering capacitor 115. The DC-DC converter 1 may further include a compensation circuit to control an output voltage by switching. For example, the compensation circuit may be a proportional-integral-derivative (PID) controller 120. For example, the PID controller 120 may have a form of a feedback controller. For example, the PID controller 120 may compare the output voltage of the switching buck regulator 110 with a reference voltage, and control the switching buck regulator 110 using the calculated comparison value.

For example, the DC-DC converter 1 illustrated in FIG. 1 may further include a comparator 130 comparing an output voltage $V_C$ compensated using the PID controller 120 with a ramp voltage $V_{RAMP}$ to generate a duty $V_{duty}$. However, this is merely an example embodiment, and the DC-DC converter 1 may further include a power supply, a flip-flop, and the like desired for an operation of the DC-DC converter.

The PID controller 120 may calculate a controlled value for controlling the output voltage using a proportional term, an integral term, and a derivative term. For example, the proportional term may be used to calculate the controlled value based on an error in a current state. For example, the integral term may be used to calculate the controlled value for reducing an error in a normal state. For example, the derivative term may be used to reduce an overshoot occurring when the output voltage changes abruptly.

For example, the DC-DC converter 1 illustrated in FIG. 1 may include a PID controller 120 implemented using an operational amplifier Ay, a plurality of resistors, and a plurality of capacitors. However, this is merely an example embodiment, and the present inventive concepts may not be limited thereto. For example, the compensation circuit included in the DC-DC converter 1 may include a PI controller, a PD controller, or a P controller including only a portion of the PID controller 120. In addition, the PID controller 120 may be implemented differently from the circuit structure illustrated in FIG. 1.

Meanwhile, in a circuit (e.g., a processor of a high performance core (HPC)) for a relatively high-speed operation, relatively high power of a level of several tens to several hundred watts (W) may be applied. For example, the circuit with high power applied may need a converter converting a voltage with high efficiency. Further, a switching technique for dynamic voltage scaling (DVS) may be needed to quickly reach a target voltage according to a change in an input signal or a change in a load.

In order to improve a DVS transient response characteristic in the DC-DC converter 1 of FIG. 1, it is desired to increase a frequency at which switching is performed. For example, because a switching frequency of the DC-DC converter 1 is proportional to a bandwidth of the operational amplifier Ay included in the PID controller 120, the PID controller 120 may be configured to include an operational amplifier Av having a relatively high bandwidth.

Meanwhile, the comparator 130 for generating the duty $V_{duty}$ by comparing the output voltage $V_C$ compensated by using the PID controller 120 with the ramp voltage $V_{RAMP}$ may also operate at a relatively high speed. However, there may be a problem that a capacitor included in the PID controller 120 occupies a relatively large area compared to other elements, and thus the comparator 130 operating at a relatively high speed consumes a relatively high amount of power.

Figure 2:
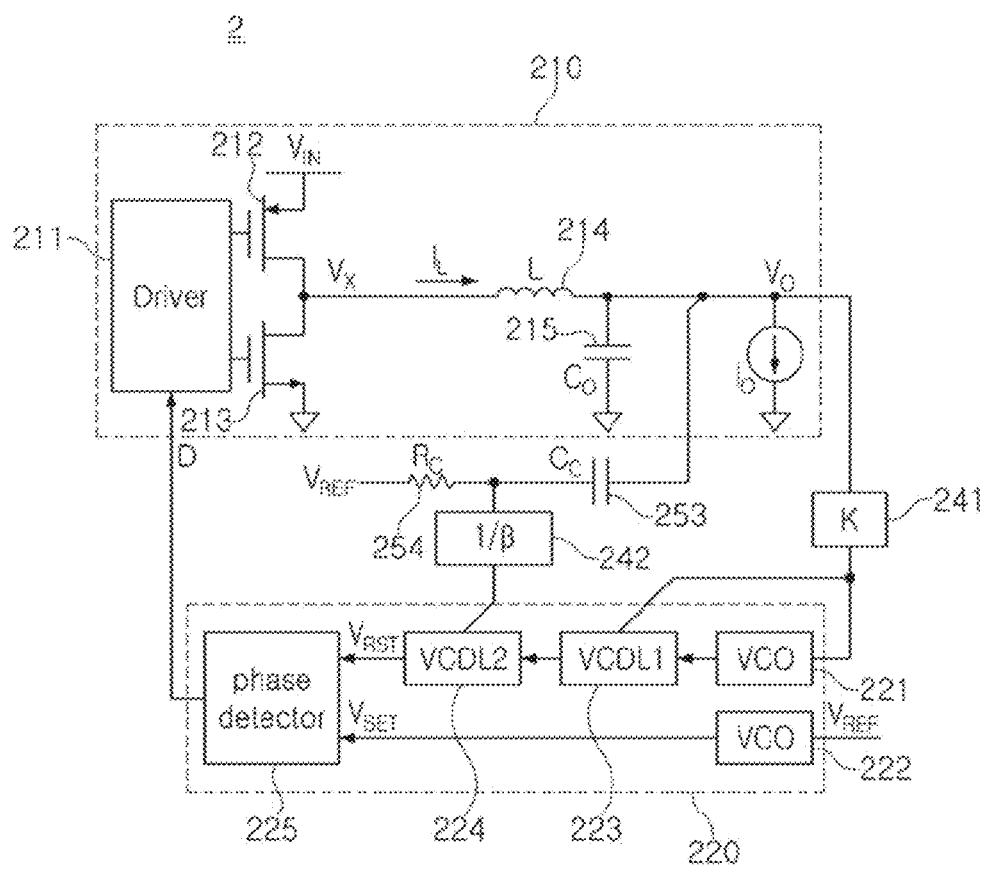
FIG. 2 is a circuit diagram of a voltage mode DC-DC converter operating in a time domain.

FIG. 2 is a circuit diagram of a voltage mode DC-DC converter operating in a time domain.

Referring to FIG. 2, a DC-DC converter 2 may be a converter in which elements that may cause a problem in the DC-DC converter 1 illustrated in FIG. 1 when a high-speed switching technology is applied are removed. For example, the elements that may cause a problem may be an operational amplifier Av having a relatively high bandwidth, and a comparator 130 operating at a relatively high speed. For example, the DC-DC converter 2 may include a switching buck regulator 210, a controller 220, and a voltage divider 241

The DC-DC converter 2 may perform a process of generating a duty D by converting an output voltage of the switching buck regulator 210 into a time domain. Accordingly, the DC-DC converter 2 may include other circuits included in the controller 220 instead of the operational amplifier and the comparator.

Meanwhile, the switching buck regulator 210 included in the DC-DC converter 2 may have a configuration corresponding to the switching buck regulator 110 included in the DC-DC converter 1 illustrated in FIG. 1. Because the DC-DC converter 2 includes a voltage divider 241 including a resistor, a separate equivalent series resistor $R_{ESR}$ may not be included. However, this is merely an example embodiment, and the present inventive concepts may not be limited thereto.

For example, the controller 220 of the DC-DC converter 2 may include a voltage controlled oscillator VCO, a voltage controlled delay line VCDL, and a phase detector 225 instead of an operational amplifier and a comparator. For example, the controller 220 may include a first voltage controlled oscillator 221, a second voltage controlled oscillator 222, a first voltage controlled delay line 223, a second voltage controlled delay line 224, and a phase detector 225. For example, the first voltage controlled oscillator 221 and the first voltage controlled delay line VCDL1 223 may be sequentially connected to be connected to the phase detector 225. Meanwhile, the second voltage controlled delay line 224 may be connected to the phase detector 225 through a separate path. The second voltage controlled oscillator 222 may be connected to the phase detector 225 through another separate path.

The phase detector 225 may generate a duty D by using a phase difference between a reset voltage $V_{RST}$ based on an output voltage of the switching buck regulator 210 and a set voltage $V_{SET}$ based on a reference voltage $V_{REF}$. For example, the reset voltage $V_{RST}$ may be a signal output from the first voltage controlled oscillator 221 through the first voltage controlled delay line 223 and the second voltage controlled delay line 224. Meanwhile, the set voltage $V_{SET}$ may be an output signal of the second voltage controlled oscillator 222 to which the reference voltage $V_{REF}$ is input.

The voltage controlled oscillator VCO may output a signal having an oscillation frequency controlled by the input voltage signal. For example, an output signal of the switching buck regulator 210 scaled using the voltage divider 241 may be input to the first voltage controlled oscillator 221. Meanwhile, as described above, a reference voltage $V_{REF}$ may be input to the second voltage controlled oscillator 222. For example, the first voltage controlled oscillator 221 may serve as an integrator for PID control.

An output signal of the switching buck regulator 210 scaled using the voltage divider 241 may be input to the first voltage controlled delay line 223 together with the output signal of the first voltage controlled oscillator 221. Meanwhile, an output signal of the switching buck regulator 210 that has passed through an RC filter and an output buffer 242 may be input to the second voltage controlled delay line 224, together with the output signal of the first voltage controlled delay line 223. For example, the RC filter may include a compensation filtering capacitor 253 and a compensation filtering resistor 254 to which a reference voltage is applied. The RC filter may be a high pass filter. For example, an output of the RC filter may be scaled through the output buffer 242. For example, a gain of the output buffer 242 may have a value of $1/\beta$, lower than 1.

In a PID control system using the controller 220, a transfer function can be represented by Equation 1. In Equation 1, $K_{VCO}$, $K_{VCDL1}$, and $K_{VCDL2}$ may be a gain of the first and second voltage controlled oscillators 221 and 222, a gain of the first voltage controlled delay line 223, and a gain of the second voltage controlled delay line 224, respectively.

$$H_2 = \frac{K_{VCO}}{s} + KK_{VCDL1} + sR_CC_C\beta K_{VCDL2} \quad \text{[Equation 1]}$$

In order for the PID control system to operate, the number of zero points appearing on the transfer function may need to be greater than the number of pole points. For example, the first voltage controlled oscillator 221 may be related to an integral term of Equation 1, and may generate a pole in the PID control system. Meanwhile, the first voltage control delay line 223 may be related to a proportional term of Equation 1, and may generate a zero point in the PID control system. The second voltage controlled delay line 224 may be related to a derivative term of Equation 1, and may generate a zero point in the PID control system. Accordingly, the DC-DC converter 2 can perform PID control using the controller 220 including two voltage controlled oscillators 221 and 222 and two voltage controlled delay lines 223 and 224.

Meanwhile, stability of the PID control system may be related to the size of the proportional term in Equation 1. For example, in order to place a zero point in a location having a low frequency, a gain $K_{VCDL1}$ of the first voltage controlled delay line 223 needs to be large. The gain $K_{VCDL1}$ of the first voltage controlled delay line 223 may be related to a delay time. In other words, in the DC-DC converter 2, if the stability of the PID control system is improved, the delay time of the system may increase. In this case, there may be a limitation in increasing a bandwidth of a loop included in the PID control system, and improving the transient response characteristic of the switching buck regulator 210.

Figure 3:
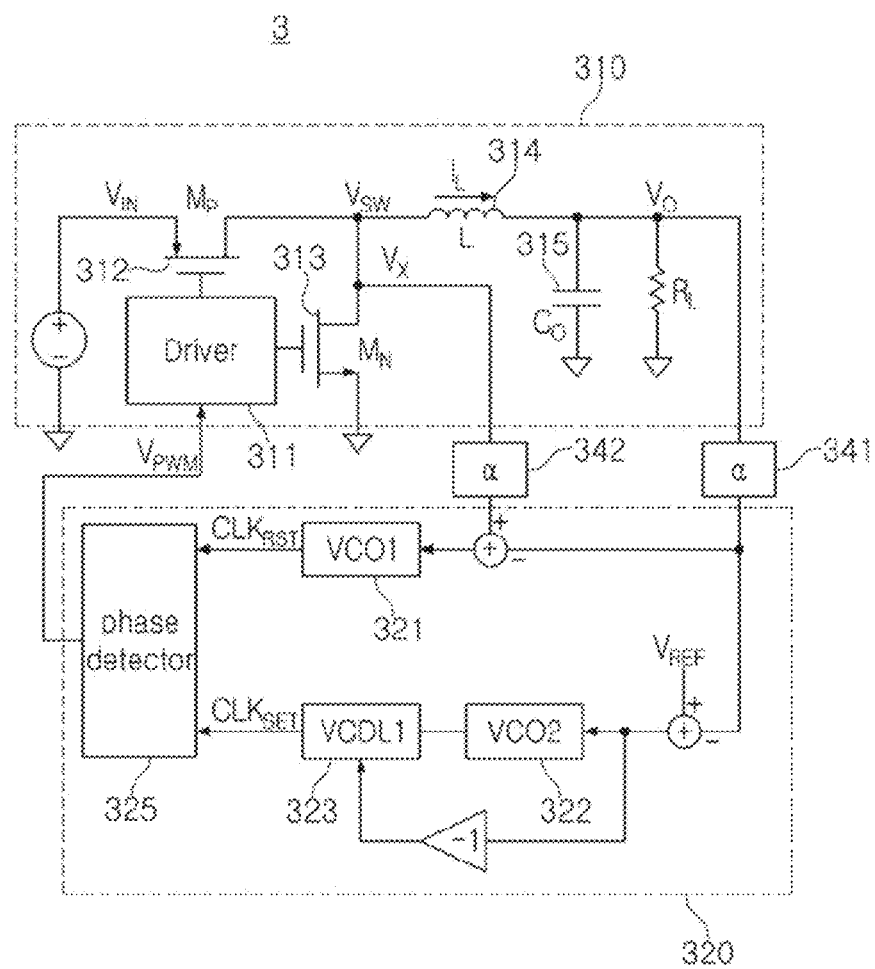
FIG. 3 is a circuit diagram of a current mode DC-DC converter operating in a time domain.

FIG. 3 is a circuit diagram of a current mode DC-DC converter operating in a time domain.

Referring to FIG. 3, a DC-DC converter 3 may be a converter in which the second voltage controlled delay line VCDL2 is removed from the DC-DC converter 2 illustrated in FIG. 2. For example, the DC-DC converter 3 may be a DC-DC converter 3 in a current mode that is configured to input a signal output from a power switch to a voltage controlled oscillator. For example, the DC-DC converter 3 may include a switching buck regulator 310, a controller 320, and output buffers 341 and 342.

Meanwhile, the switching buck regulator 310 included in the DC-DC converter 3 may have a configuration corresponding to the switching buck regulator 210 included in the DC-DC converter 2 illustrated in FIG. 2. Meanwhile, the DC-DC converter 3 may further include an equivalent parallel resistance $R_L$. However, this is merely an example embodiment and the present inventive concepts may not be limited thereto.

Meanwhile, the controller 320 of the DC-DC converter 3 may include a first voltage controlled oscillator VCO1 321, a second voltage controlled oscillator VCO2 322, and a first voltage controlled delay line VCDL1 323. For example, the second voltage controlled delay line 324 included in the controller 220 of the DC-DC converter 2 illustrated in FIG. 2 may be removed. Accordingly, the DC-DC converter 3 operating in a current mode may drive a PID control system with a simpler operation than the DC-DC converter 2. For example, a transient response characteristic of the DC-DC converter 3 may be improved than the transient response characteristic of the DC-DC converter 2.

For example, the first voltage controlled oscillator 321 may be connected to a node between the first power switch 312 and the second power switch 313. For example, the first voltage controlled oscillator 321 may receive a signal output from the power switch from an output buffer 342 connected to a node between the first power switch 312 and the second power switch 313. The first voltage controlled oscillator 321 may output a reset clock signal $CLK_{RST}$. Meanwhile, the second voltage controlled oscillator 322 may receive a reference voltage $V_{REF}$, and output the set clock signal $CLK_{SET}$ through the first voltage controlled delay line 323. For example, the phase detector 325 may generate a driving signal by using a phase difference between the reset clock signal CLK$_{RST}$ and the set clock signal CLK$_{SET}$.

However, the second voltage controlled delay line 324, which is removed from the DC-DC converter 3 of FIG. 3, may have a lower gain compared to a gain of the first voltage controlled delay line 323. Accordingly, in the DC-DC converter 3, similar to the DC-DC converter 2 of FIG. 2, the stability of the PID control system and the delay time of the system may be in a trade-off relationship with each other. For example, in a PID control system having relatively improved stability, there may be limitations in increasing a bandwidth of a loop included in the system and improving a transient response characteristic of the switching buck regulator 310.

Figure 4:
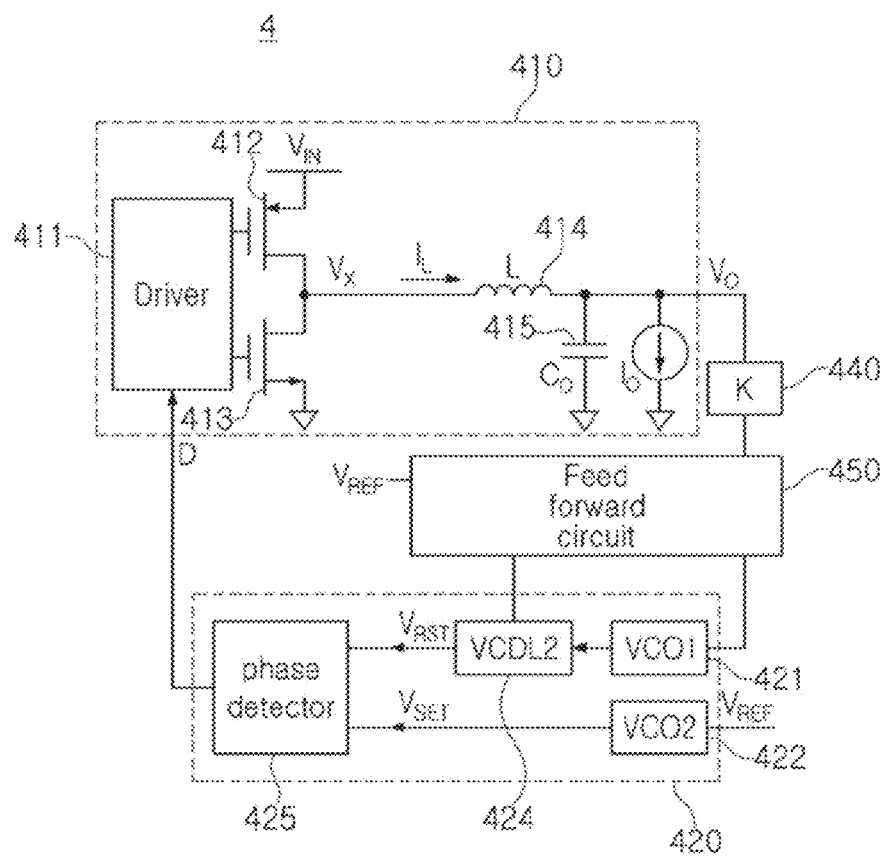
FIG. 4 is a schematic circuit diagram of a DC-DC converter according to an example embodiment of the present inventive concepts.

FIG. 4 is a schematic circuit diagram of a DC-DC converter according to an example embodiment of the present inventive concepts.

Referring to FIG. 4, a DC-DC converter 4 according to an example embodiment of the present inventive concepts may reduce a delay time of a PID control system and may improve a transient response characteristic of a switching buck regulator 410. For example, the DC-DC converter 4 may not include the first voltage controlled delay line 223 having a relatively high gain, which has been a problem in the DC-DC converter 2 included in FIG. 2.

The DC-DC converter 4 according to an example embodiment of the present inventive concepts may include a switching buck regulator 410 including a driver 411, a first power switch 412, a second power switch 413, an output filtering inductor 414, and an output filtering capacitor 415.

For example, the first power switch 412 may be connected to a power node outputting a first power voltage V$_{IN}$. The second power switch 413 may be connected to a second power node outputting a second power voltage lower than the first power voltage V$_{IN}$. For example, the second power node may be a ground node. The driver 411 may drive the first power switch 412 and the second power switch 413. Meanwhile, the output filtering inductor 414 and the output filtering capacitor 415 may filter a signal applied to a node between the first power switch 412 and the second power switch 413. However, the switching buck regulator 410 of the DC-DC converter 4 illustrated in FIG. 4 is merely an example embodiment and the present inventive concepts may not be limited thereto. For example, the switching buck regulator 410 of the DC-DC converter 4 may further include an output filtering resistor and/or a power supply.

The DC-DC converter 4 according to an example embodiment of the present inventive concepts may further include a controller 420 for compensating for an output signal of the switching buck regulator 410. For example, the controller 420 may include a first voltage controlled oscillator 421, a second voltage controlled oscillator 422, a voltage controlled delay line VCDL2 424, and a phase detector 425. For example, the voltage controlled delay line 424 connected to the first voltage controlled oscillator 421 may be connected to the phase detector 425, and the second voltage controlled oscillator 422 may be connected to the phase detector 425 through a separate path.

For example, the first voltage controlled oscillator 421 and the second voltage controlled oscillator 422 may output a signal having an oscillation frequency controlled by an input voltage signal. Meanwhile, the voltage controlled delay line 424 may reduce an overshoot when an output signal of the first voltage controlled oscillator 421 changes abruptly.

In the DC-DC converter 4 according to an example embodiment of the present inventive concepts, the voltage controlled delay line 424 to which the output signal is applied from the first voltage controlled oscillator 421 may generate a reset voltage V$_{RST}$, and the second voltage controlled oscillator 422 may generate a reset voltage V$_{SET}$. Meanwhile, the phase detector 425 may generate a driving signal by detecting a phase difference between the set voltage V$_{SET}$ and the reset voltage V$_{RST}$. For example, the controller 420 may input the generated driving signal to the switching buck regulator 410, and the driver 411 included in the switching buck regulator 410 may output a switching signal for driving the first power switch 412 and the second power switch 413 based on the input driving signal.

Circuits of the first voltage controlled oscillator 421, a second voltage controlled oscillator 422, a voltage controlled delay line 424, and the phase detector 425 included in the controller 420 of the DC-DC converter 4 according to an example embodiment of the present inventive concepts may be designed in various ways. For example, the first voltage controlled oscillator 421 and the second voltage controlled oscillator 422 may be the same circuit. However, this is merely an example embodiment and the present inventive concepts may not be limited thereto. The circuits included in the controller 420 may be used together to operate as at least a portion of the PID control system.

The DC-DC converter 4 according to an example embodiment of the present inventive concepts may include a voltage divider 440 for performing scaling before applying the output signal of the switching buck regulator 410 to the controller 420. For example, the voltage divider 440 may be connected to an output terminal of the switching buck regulator 410 and may have a gain of K. For example, K may be a value lower than 1.

Meanwhile, the controller 420 may convert the scaled output signal of the switching buck regulator 410 through the voltage divider 440 into a time domain, and compensate the converted output signal using the reference voltage V$_{REF}$. For example, the output signal of the switching buck regulator 410 may be defined as a first output signal.

The DC-DC converter 4 according to an example embodiment of the present inventive concepts may further include a feed forward circuit 450 connected between the switching buck regulator 410 and the controller 420. For example, the feedforward circuit 450 may detect a disturbance related to the first output signal of the switching buck regulator 410 and input the detected disturbance to the controller 420. The DC-DC converter 4 may compensate for the first output signal based on the disturbance of the first output signal. For example, the first output signal compensated by the feed forward circuit 450 may be defined as a second output signal. For example, the feed forward circuit 450 may output a first output signal and a second output signal to the controller 420. For example, the controller may convert the second output signal together with the first output signal into a time domain.

In the controller 420 of the DC-DC converter 4 according to an example embodiment of the present inventive concepts, a signal input to the first voltage controlled oscillator 421 may include a first output signal and a second output signal. In other words, the first voltage controlled oscillator 421 may include an output signal of the switching buck regulator 410 not passing through the feed forward circuit 450 and an output signal passing through the feed forward circuit 450. The controller 420 may compensate for the output signal of the switching buck regulator 410 based on the first output signal and the second output signal together with the feed forward circuit 450. For example, the controller 420 may perform the same operation as the PID controller. A detailed operation process in the PID control system included in the DC-DC converter 4 according to an example embodiment of the present inventive concepts will be described later.

The DC-DC converter 4 according to an example embodiment of the present inventive concepts may output a first voltage before a driving signal is applied to the switching buck regulator 410, and output a second voltage (e.g., a target voltage) through a PID control system after a driving signal is applied. For example, a time taken to output the second voltage after the driving signal is applied may be determined based on a gain of the voltage controlled delay line 424 included in the controller 420.

Meanwhile, the voltage controlled delay line VCDL2 424 of the DC-DC converter 4 may correspond to the second voltage controlled delay line VCDL2 224 of the DC-DC converter 2 illustrated in FIG. 2. In other words, the voltage controlled delay line 424 of the DC-DC converter 4 may have a relatively small gain as compared to the first voltage-controlled delay line 223 of the DC-DC converter 2. Accordingly, the DC-DC converter 4 according to an example embodiment of the present inventive concepts may improve stability of the PID control system, and may increase a bandwidth of a loop included in the system to improve the transient response characteristic of the switching buck regulator 410.

Figure 5:
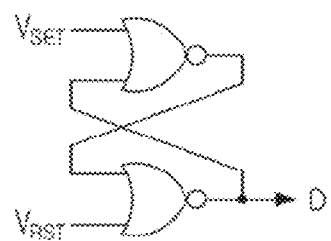
FIG. 5 is a circuit diagram of a phase detector included in a DC-DC converter according to an example embodiment of the present inventive concepts.
Figure 6A:
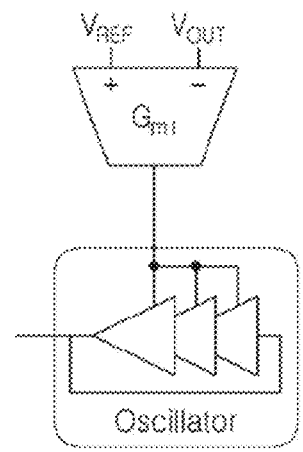
FIGS. 6A and 6B are circuit diagrams of a voltage controlled oscillator included in a DC-DC converter according to an example embodiment of the present inventive concepts.
Figure 6B:
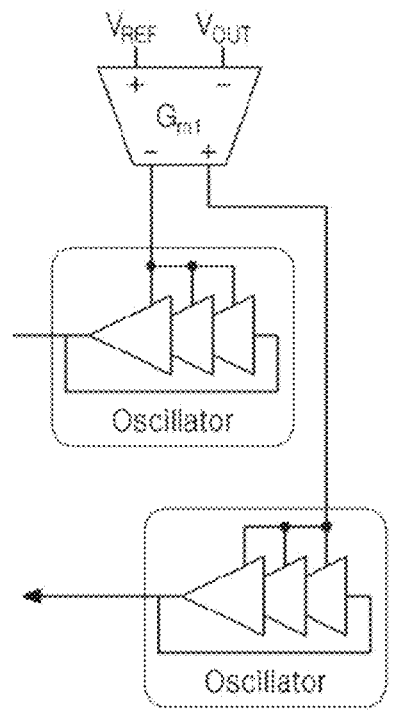
Figure 7A:
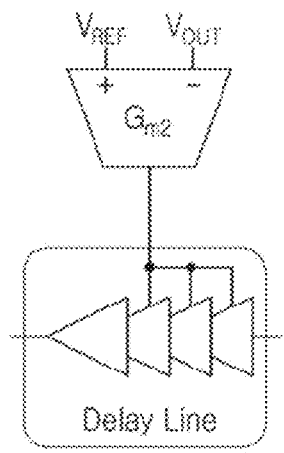
FIGS. 7A and 7B are circuit diagrams of a voltage controlled delay line included in a DC-DC converter according to an example embodiment of the present inventive concepts.
Figure 7B:
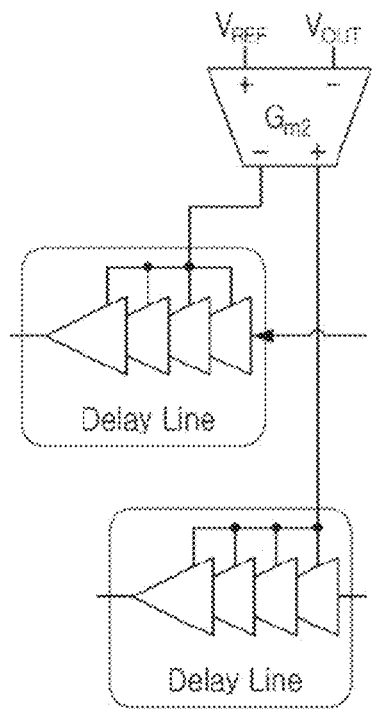

FIG. 5 is a circuit diagram of a phase detector included in a DC-DC converter according to an example embodiment of the present inventive concepts. FIGS. 6A and 6B are circuit diagrams of a voltage controlled oscillator included in a DC-DC converter according to an example embodiment of the present inventive concepts. FIGS. 7A and 7B are circuit diagrams of a voltage controlled delay line included in a DC-DC converter according to an example embodiment of the present inventive concepts.

FIGS. 5 to 7B may be some example embodiments of the phase detector 425, the voltage controlled oscillators 421 and 422, or the voltage controlled delay line 424 included in the DC-DC converter 4 illustrated in FIG. 4. For example, FIG. 5 may be a circuit diagram of the phase detector 425, FIGS. 6A and 6B may be circuit diagrams of the voltage controlled oscillators 421 and 422, and FIGS. 7A and 7B are circuit diagrams of the voltage controlled delay line 424.

Referring to FIG. 5, the phase detector 425 included in the DC-DC converter 4 according to an example embodiment of the present inventive concepts may include an SR latch. For example, the phase detector 425 may include two NOR logic circuits, and an output of each of the NOR logic circuits may be input to the other NOR logic circuit. The phase detector 425 included in the DC-DC converter 4 according to an example embodiment of the present inventive concepts may receive a set voltage $V_{SET}$ and a reset voltage $V_{RST}$ to output a driving signal D. However, this is merely an example embodiment and the present inventive concepts may not be limited thereto. For example, the phase detector 425 may further include other components, such as a filter, in addition to the SR latch. Further, the phase detector 425 may include a circuit other than the SR latch.

Referring to FIG. 6A, the voltage controlled oscillators 421a and 422a included in the DC-DC converter 4 according to an example embodiment of the present inventive concepts may output a signal having an oscillation frequency controlled by an input voltage signal. For example, the voltage controlled oscillators 421a and 422a may include a Gm cell having two inputs and one output and serving as a divider, and a current controlled oscillator CCO outputting a frequency controlled by an output of the Gm cell. Meanwhile, referring to FIG. 6B, the voltage controlled oscillators 421b and 422b may also include a Gm cell and two current controlled oscillators CCO. For example, the Gm cell may have two outputs, and each of the outputs may be output through a different one of the two current controlled oscillators CCO. For example, the DC-DC converter 4 may use two signals output from the two current controlled oscillators CCO in a differential form.

Referring to FIG. 7A, the voltage-controlled delay line 424a included in the DC-DC converter 4 according to an example embodiment of the present inventive concepts may operate to reduce an overshoot when the output signal of the voltage-controlled oscillator changes abruptly. For example, the voltage controlled delay line 424a may include a Gm cell having two inputs and one output and serving as a divider, and a delay circuit delaying and outputting an output of the Gm cell. Meanwhile, referring to FIG. 7B, the voltage controlled delay line 424b may include a Gm cell and two delay circuits. For example, the Gm cell may have two outputs, and each of the outputs may be output through a different one of the two delay circuits. For example, the DC-DC converter 4 may use the two signals output from the two delay circuits in a differential form. However, the voltage controlled oscillators 421a, 422a, 421b, and 422b and the voltage controlled delay lines 424a and 424b illustrated in FIGS. 6A to 7B are merely examples and the present inventive concepts may not be limited thereto.

Figure 8:
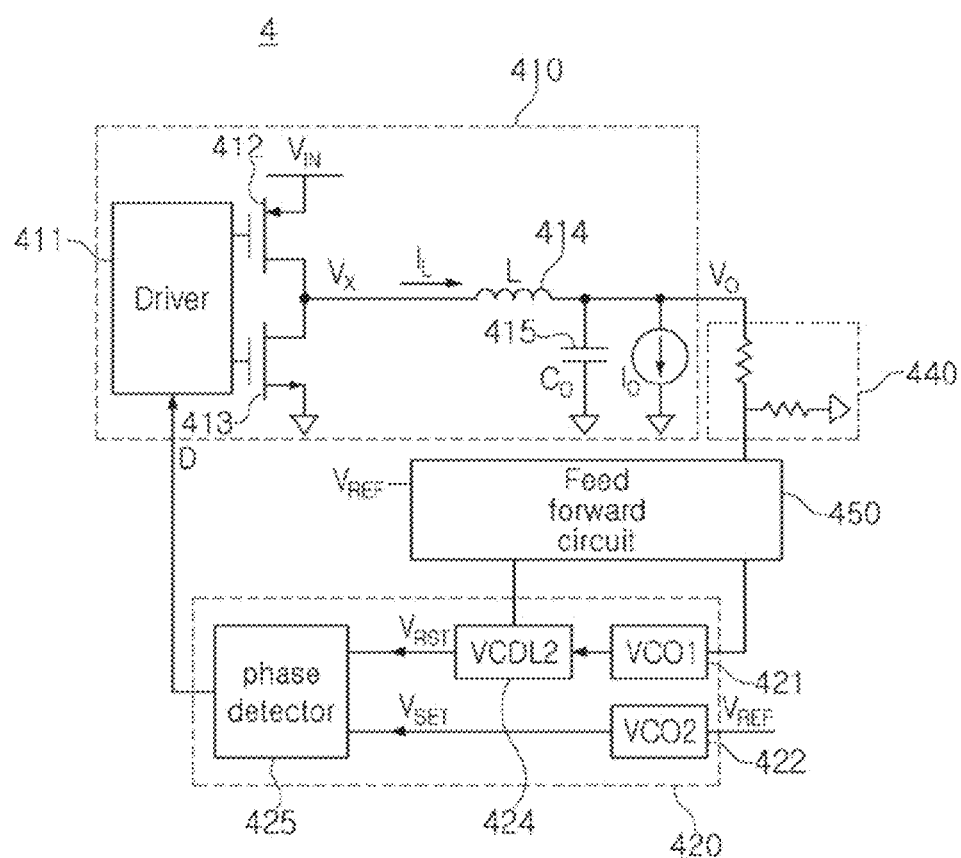
FIG. 8 is a circuit diagram illustrating a voltage divider included in a DC-DC converter according to an example embodiment of the present inventive concepts.

FIG. 8 is a circuit diagram illustrating a voltage divider included in a DC-DC converter according to an example embodiment of the present inventive concepts.

FIG. 8 may be a diagram for explaining a voltage divider 440 included in the DC-DC converter 4 according to an example embodiment of the present inventive concepts illustrated in FIG. 4. For example, the DC-DC converter 4 may include a voltage divider 440 disposed between the switching buck regulator 410 and the feed forward circuit 450.

For example, the voltage divider 440 may perform scaling to compare the output signal of the switching buck regulator 410 with a reference voltage $V_{REF}$. For example, the voltage divider 440 may have a gain of K, and K may be a value of 1 or less. However, this is merely an example embodiment and the present inventive concepts may not be limited thereto. For example, the gain K of the voltage divider 440 may be determined based on the reference voltage $V_{REF}$. For example, the gain of K of the voltage divider 440 may determine a strength of a signal input to the feed forward circuit 450 and the controller 420.

Referring to FIG. 8, the voltage divider 440 included in the DC-DC converter 4 according to an example embodiment of the present inventive concepts may include a plurality of resistors. For example, in the voltage divider 440 illustrated in FIG. 8, the gain of K of the voltage divider 440 may be determined by a ratio between a plurality of resistors.

However, the voltage divider 440 illustrated in FIG. 8 is merely an example embodiment and the present inventive concepts may not be limited thereto. For example, the voltage divider 440 may include more resistors than illustrated, and may further include elements such as an operational amplifier, or the like. Further, the resistor included in the voltage divider 440 may be a variable resistor. Further, an additional circuit for determining the gain of K of the voltage divider 440 may be further included.

Figure 9:
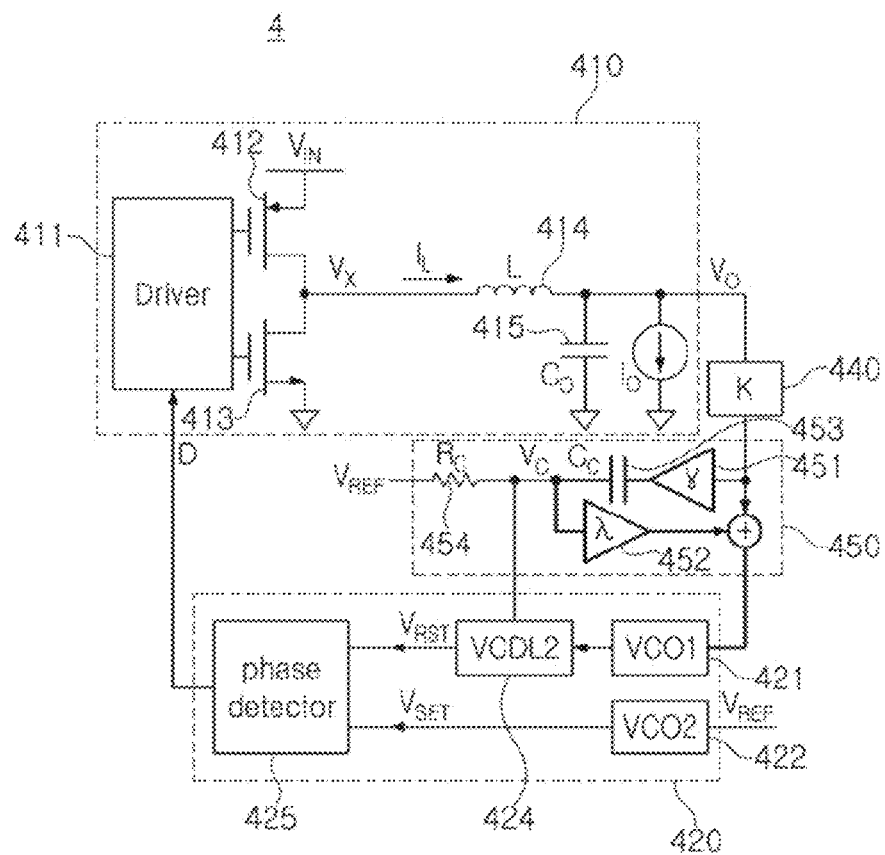
FIG. 9 is a circuit diagram illustrating a feed forward circuit included in a DC-DC converter according to an example embodiment of the present inventive concepts.

FIG. 9 is a circuit diagram illustrating a feed forward circuit included in a DC-DC converter according to an example embodiment of the present inventive concepts.

FIG. 9 may be a diagram for explaining a feed forward circuit 450 included in the DC-DC converter 4 according to an example embodiment of the present inventive concepts illustrated in FIG. 4. Referring to FIG. 9, a DC-DC converter according to an example embodiment of the present inventive concepts may include a feed forward circuit 450 connected between a switching buck regulator 410 and a controller 420.

For example, the feed forward circuit 450 may include a first buffer 451, a second buffer 452, an RC filter, and an adder. For example, the feed forward circuit 450 may include a feed forward path for generating a second output signal by compensating for a first output signal output from the switching buck regulator 410. For example, the first buffer 451, the RC filter, the second buffer 452, and the adder may be sequentially disposed on the feed forward path.

Meanwhile, the feed forward circuit 450 may output the second output signal to the controller 420 together with the first output signal output from the switching buck regulator 410 using an adder. For example, the first output signal and the second output signal may be applied to the controller 420, for example, the first voltage controlled oscillator 421.

In the DC-DC converter 4 according to an example embodiment of the present inventive concepts, the RC filter may include a compensation filtering capacitor Cc 453 connected to an output terminal of the first buffer 451 and an input terminal of the second buffer 452, and a compensation filtering resistor $R_C$ 454 connected to the compensation filtering capacitor 453 and the input terminal of the second buffer 452. Meanwhile, a reference voltage $V_{REF}$ may be applied to the compensation filtering resistor 454.

For example, the input terminal of the first buffer 451 included in the feedforward circuit 450 may be connected to an output terminal of the switching buck regulator 410 and an adder. Meanwhile, the output terminal of the first buffer 451 may be connected to an RC filter. For example, the output terminal of the first buffer 451 may be connected to the compensation filtering capacitor 453 of the RC filter.

For example, the input terminal of the second buffer 452 included in the feed forward circuit 450 may be connected to the RC filter and the controller 420. For example, the input terminal of the second buffer 452 may be connected to the compensation filtering resistor 454 of the RC filter and the voltage controlled delay line 424. Meanwhile, the output terminal of the second buffer 452 may be connected to an adder. In the DC-DC converter 4 according to an example embodiment of the present inventive concepts, the first buffer 451 may have a first gain having a size of γ, and the second buffer 452 may have a second gain having a size of λ. For example, the first gain and the second gain may be different values other than 1. However, this is merely an example embodiment, and example embodiments the present inventive concepts are not limited thereto, and the first gain and the second gain may have the same values as each other. Also, at least one of the first gain and the second gain may be 1.

In the PID control system using the controller 420, a transfer function can be expressed by Equation 2. In Equation 2, $K_{VCO}$ and $K_{VCDL2}$ may be a gain of the first and second voltage controlled oscillators 421 and 422 and a gain the voltage controlled delay line 424, respectively.

$$H_4 = \frac{K_{VCO}}{s} + R_C C_C K\gamma\lambda K_{VCO} + sR_C C_C K\gamma K_{VCDL2} \quad \text{[Equation 2]}$$

In the DC-DC converter 4 according to an example embodiment of the present inventive concepts, Equation 2 may correspond to Equation 1 described in the description related to FIG. 2. For example, Equations 1 and 2 may each include an integral term, a proportional term, and a derivative term, and each term may correspond to each other. In other words, when the DC-DC converter 2 and the DC-DC converter 4 illustrated in FIG. 2 are designed to have the same transfer function, the two DC-DC converters 2 and 4 perform the same operation with each other.

The feed forward circuit 450 included in the DC-DC converter 4 according to an example embodiment of the present inventive concepts may perform a first operation on a first output signal output from the switching buck regulator 410 to generate a second output signal. For example, the first operation may be a differential operation.

Meanwhile, the controller 420 may perform a second operation on the first output signal and the second output signal to derive the integral term and the proportional term of Equation 2. For example, the second operation may be an integral operation. Accordingly, the first output signal on which the second operation is performed may correspond to an integral term, and the second output signal on which the second operation is performed after the first operation is performed may correspond to a proportional term. For example, the second operation may be performed by the first voltage controlled oscillator 421.

The controller 420 included in the DC-DC converter 4 according to an example embodiment of the present inventive concepts may perform a third operation on a signal on which the second operation has been performed. For example, the third operation may be a differential operation. For example, the third operation may be performed by the voltage controlled delay line 424.

Meanwhile, a reference voltage $V_{REF}$ may be applied to the second voltage controlled oscillator 422, and the second voltage controlled oscillator 422 may output a set voltage $V_{SET}$ for detecting a phase difference with the reset voltage $V_{RST}$.

As described above, as a part of the PID control system, the feed forward circuit 450 and the voltage controlled delay line may function as a differentiator, and the first voltage controlled oscillator 421 may function as an integrator.

Equations 1 and 2 may have different configurations for determining a size of the proportional term related to the stability of the PID control system. For example, the size of the proportional term in Equation 1 may be determined by a gain $K_{VCDL1}$ of the first voltage controlled delay line 223. On the other hand, in Equation 2, the size of the proportional term may be determined by a gain $K_{VCO}$ of the first and second voltage controlled oscillators 421 and 422. Accordingly, it is possible to improve the stability of the PID control system without increasing a gain $K_{VCDL2}$ of the voltage control delay line 424 associated with the delay time of the PID control system.

The DC-DC converter 4 according to an example embodiment of the present inventive concepts may include a loop having a relatively high bandwidth while improving the stability of the PID control system, and further may include a switching buck regulator 410 having improved transient response characteristics. For example, when a signal and/or a load input to the DC-DC converter 4 changes, the time taken for the output signal to reach a normal state may be faster than that of the DC-DC converters 1, 2, and 3 illustrated in FIGS. 1 to 3.

However, the DC-DC converter 4 illustrated in FIG. 9 is merely an example embodiment and may not be limited thereto. For example, the DC-DC converter 4 according to an example embodiment of the present inventive concepts may further include an additional circuit for calibrating the first voltage controlled oscillator 421 and the second voltage controlled oscillator 422. For example, the controller 420 may further include a circuit for controlling a capacitor included in the first voltage controlled oscillator 421 and the second voltage controlled oscillator 422, or controlling a bias current of the first voltage controlled oscillator 421 and the second voltage controlled oscillator 422. Meanwhile, the additional circuit may be designed in various ways, and may not be limited to any one example embodiment.

Meanwhile, the DC-DC converter 4 according to an example embodiment of the present inventive concepts may be driven in a voltage mode, but may be modified to be driven in a current mode with reference to the DC-DC converter 3 illustrated in FIG. 3. For example, a DC-DC converter including the feed forward circuit 450 and driven in a current mode may not include a voltage controlled delay line 424. For example, the controller 420 may include a first voltage controlled oscillator 421, a second voltage controlled oscillator 422, and a phase detector 425. However, this is merely an example embodiment and the present inventive concepts may not be limited thereto. For example, the controller 420 may further include an additional component for an operation.

Figure 10:
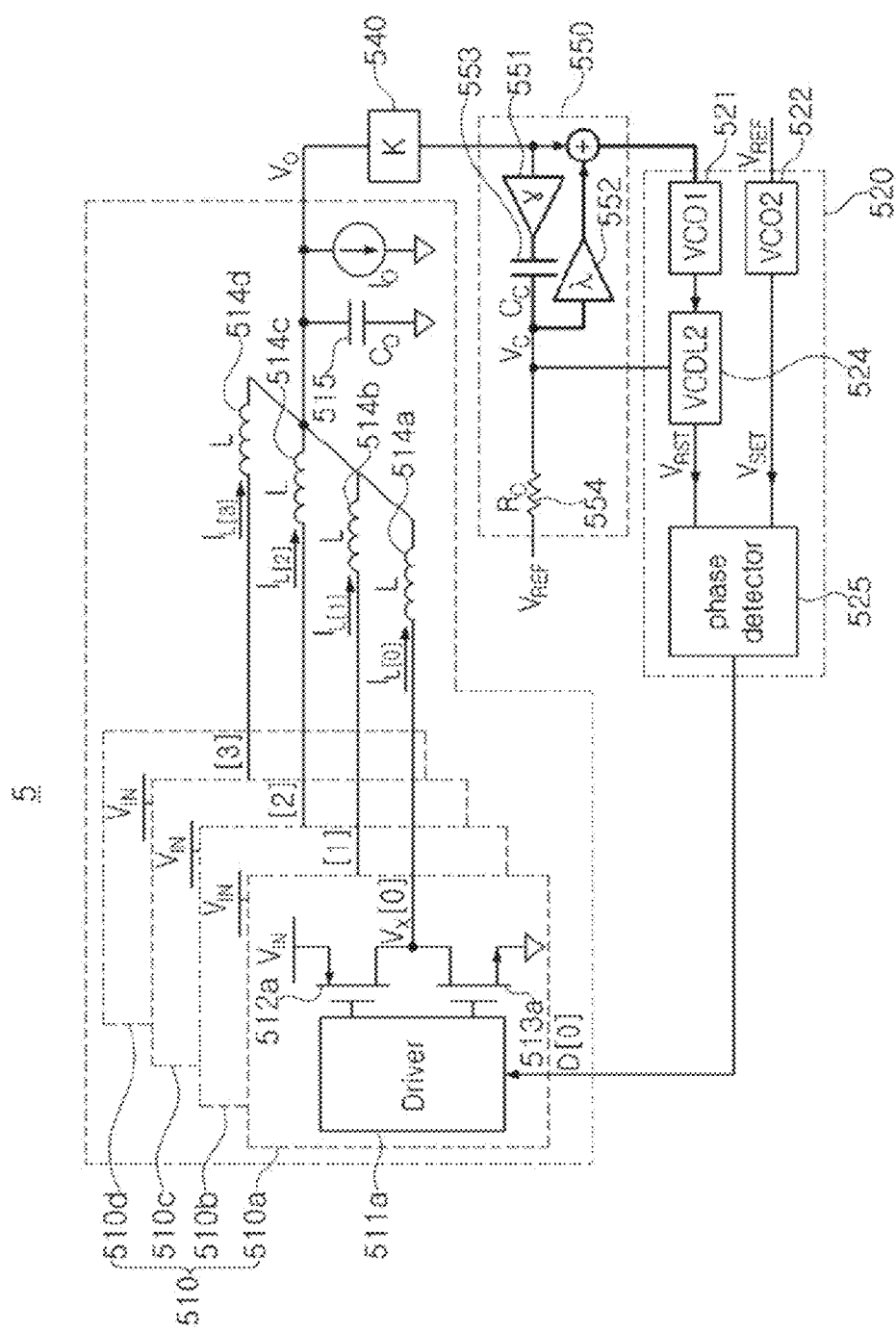
FIG. 10 is a circuit diagram of a DC-DC converter according to an example embodiment of the present inventive concepts.

FIG. 10 is a circuit diagram of a DC-DC converter according to an example embodiment of the present inventive concepts.

Referring to FIG. 10, a DC-DC converter 5 according to an example embodiment of the present inventive concepts may correspond to the DC-DC converter 4 illustrated in FIG. 9. For example, the DC-DC converter 5 may include a plurality of regulators 510 (e.g., 510a, 510b, 510c, and 510d), corresponding to the switching buck regulator 410. Other components included in the DC-DC converter 5 may be substantially the same as those included in the DC-DC converter.

However, this is merely an example embodiment, and the configuration of the DC-DC converter 5 including the plurality of regulators 510 may not be limited as illustrated in FIG. 10. For example, in FIG. 10, each of the plurality of regulators 510 is illustrated as including a corresponding one of output filtering inductors 514a, 514b, 514c, and 514d, but the present inventive concepts may not be limited thereto. Further, although the plurality of regulators 510 are illustrated as sharing an output filtering capacitor 515 in FIG. 10, example embodiments of the present inventive concepts may not be limited thereto.

Meanwhile, the controller 520 included in the DC-DC converter 5 according to an example embodiment of the present inventive concepts may generate a plurality of driving signals corresponding to the plurality of regulators 510. For example, the plurality of driving signals may be different signals. However, this is merely an example embodiment and example embodiments of the present inventive concepts are not limited thereto, and at least a portion of the plurality of driving signals may be the same signals.

In the DC-DC converter 5 according to an example embodiment of the present inventive concepts, one driver 511a of a plurality of drivers included in a corresponding one of the plurality of regulators 510 may output a switching signal for driving a corresponding first power switch 512a of first power switches and a corresponding second power switches 513a of the second power switches based on the input driving signal.

Figure 11:
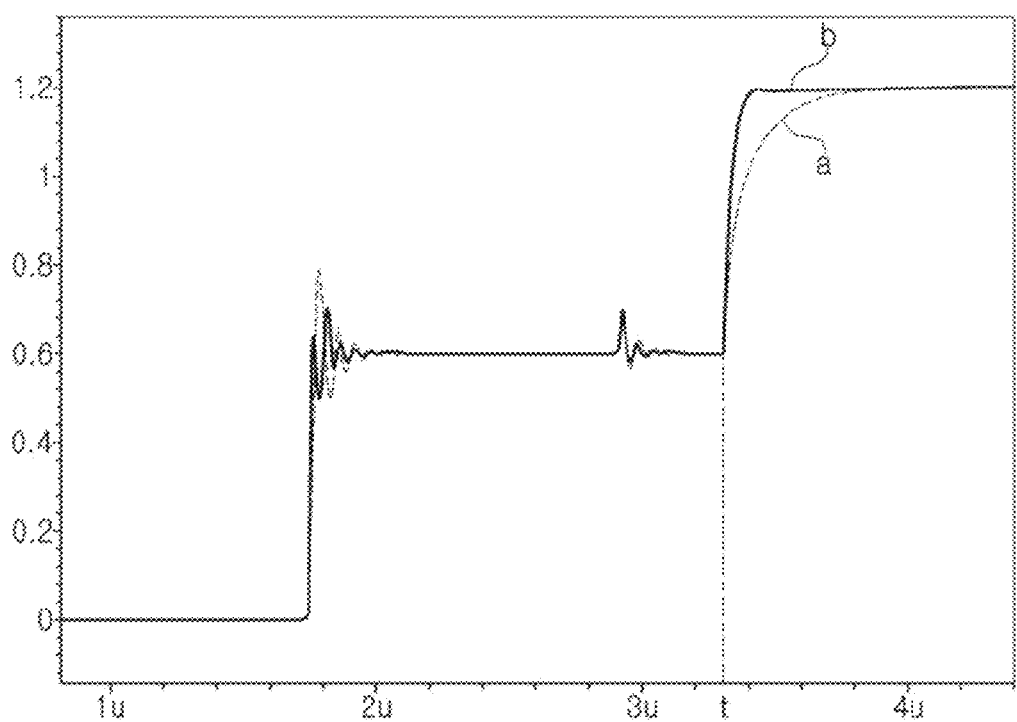
FIG. 11 is a diagram illustrating a DC-DC converter according to an example embodiment of the present inventive concepts.

FIG. 11 is a diagram illustrating a DC-DC converter according to an example embodiment of the present inventive concepts.

Referring to FIG. 11, when an input signal changes or a load changes, a DC-DC converter according to an example embodiment of the present inventive concepts may output the changed output signal. Meanwhile, the changed output signal may be compensated for by a compensation circuit such as a PID controller. However, the time taken for the output signal to become a normal state may vary according to a transient response characteristic of the compensation circuit.

Meanwhile, a graph a may be a graph illustrating a change in an output signal of any one of the DC-DC converters 1, 2, and 3 illustrated in FIGS. 1 to 3. On the other hand, a graph b may be a graph illustrating a change in an output signal of the DC-DC converter 4 illustrated in FIG. 4. For example, a voltage output due to an input signal or a change in a load may be changed from 0.6V to 1.2V. For example, an output signal at a time point t, an output signal may change. However, depending on the DC-DC converter, the time taken from 0.6V to 1.2V may vary. For example, a time taken for the output voltage to reach a normal state may be determined by a transient response characteristic of the compensation circuit.

For example, a DC-DC converter 4 corresponding to a graph b may include a feed forward circuit without including a first voltage controlled delay line having a large gain. On the other hand, one of the DC-DC converters 1, 2, and 3 corresponding to graph a may include a first voltage controlled delay line. Accordingly, it is possible to reach a target voltage of 1.2V faster in graph b than in graph a. For example, a rate at which a transient response reaches a normal state in graph b may be about 1.5 to 2.5 times faster than a rate at which a transient response reaches a normal state in graph a. However, this is merely an example and example embodiment of the present inventive concepts may not be limited thereto.

Figure 12:
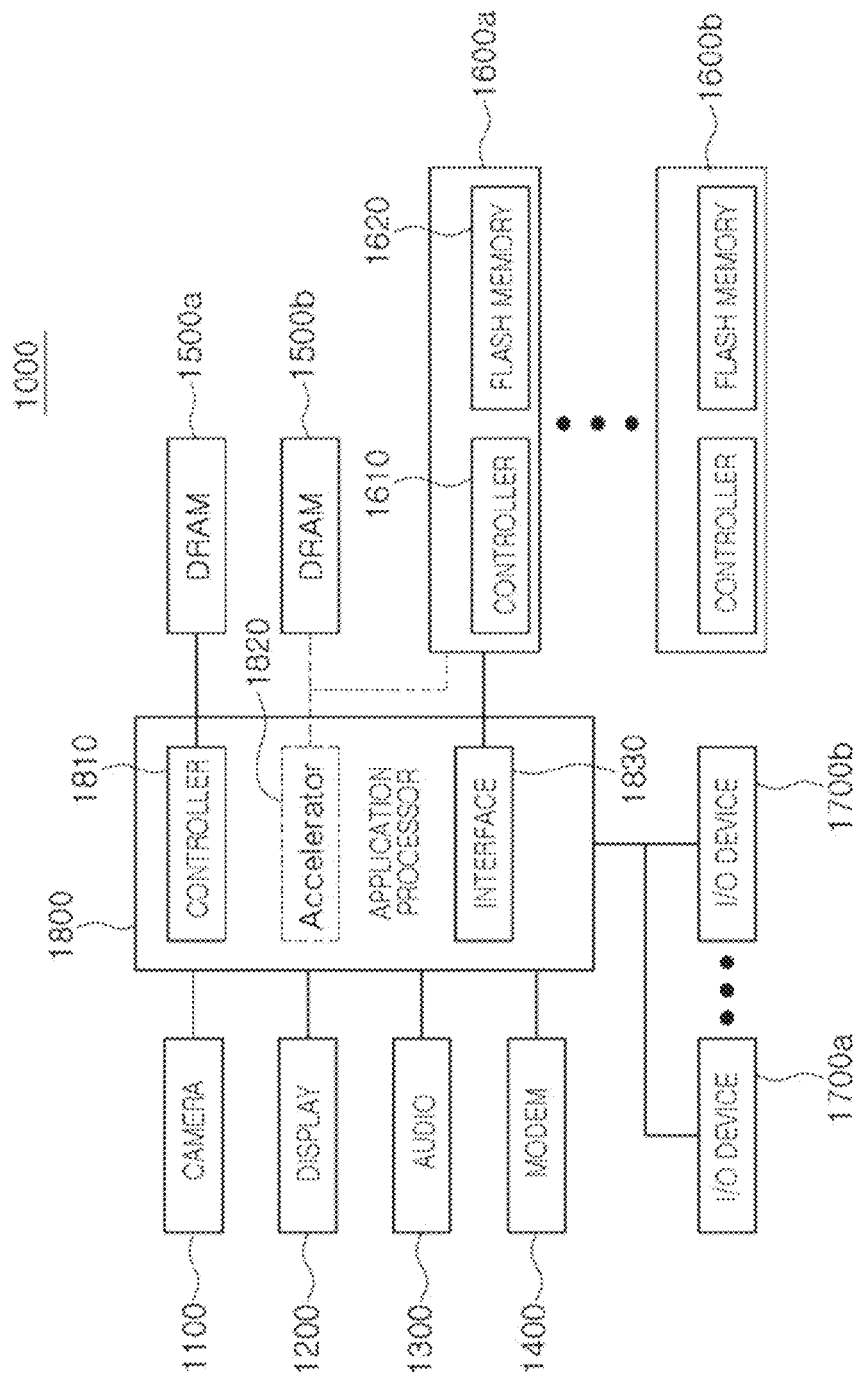
FIG. 12 is a schematic block diagram of an electronic device including a DC-DC converter according to an example embodiment of the present inventive concepts.

FIG. 12 is a schematic block diagram of an electronic device including a DC-DC converter according to an example embodiment of the present inventive concepts.

Referring to FIG. 12, a mobile system 1000 may include a camera 1100, a display 1200, an audio processing unit 1300, a modem 1400, DRAMs 1500a and 1500b, flash memory devices 1600a and 1600b, I/O devices 1700a and 1700b, and an application processor 1800 (hereinafter, referred to as "AP").

The mobile system 1000 may be implemented as a laptop computer, a portable terminal, a smartphone, a table PC, a wearable device, a healthcare device, or an Internet-of-Things (IoT) device. Further, the mobile system 1000 may be implemented as a server or a personal computer.

The camera 1100 may capture a still image or a video under a user's control. The mobile system 1000 may acquire specific information by using a still image/video captured by the camera 1100 or may convert and store the still image/video into other types of data such as text, or the like. In some example embodiments, the mobile system 1000 may recognize a character string included in the still image/video captured by the camera 1100 and may also provide a text or audio translation corresponding to the character string. As described above, fields of application of the camera 1100 in the mobile system 1000 are becoming increasingly diverse. In an example embodiment, the camera 1100 may transmit data such as still images/videos to the AP 1800 according to a D-Phy or C-Phy interface according to a MIPI standard.

The display 1200 may be implemented as various forms such as Liquid Crystal Display (LCD), Organic Light Emitting Diodes (OLED), Active-Matrix Organic Light-Emitting Diode (AM-OLED), Plasma Display Panel (PDP), Field Emission Display (FED), electronic paper, or the like. In an example embodiment, the display 1200 may be used as an input device of the mobile system 1000 by providing a touch screen function. In addition, the display 1200 may be provided integrally with a fingerprint sensor, or the like, to provide a security function of the mobile system 1000. In an example embodiment, the AP 1800 may transmit image data to be displayed on the display 1200 to the display 1200 according to a D-Phy or C-Phy interface according to the MIPI standard.

The DC-DC converter described with reference to example embodiments of the present inventive concepts may be applied to the mobile system 1000 illustrated in FIG. 12. For example, by rapidly outputting a signal using a DC-DC converter having an improved transient response characteristic, the performance of the mobile system 1000 may be improved. Meanwhile, this may be more prominent when a relatively high driving current and relatively fast transient response characteristics are desired, such as in the AP 1800 desiring relatively high performance.

For example, by improving the transient response characteristic of the DC-DC converter outputting the converted signal, a data transmission speed between the AP 1800 and the display 1200 and/or between the AP 1800 and the camera 1100 may be increased, and noise characteristics may be improved. Further, by improving the transient response characteristic of the DC-DC converter outputting the converted signal, an influence of a communication between the AP 1800 and the display 1200 and/or a communication between the AP 1800 and the camera 1100 on other components may be minimized and power consumption may be reduced.

The audio processing unit 1300 may process audio data stored in the flash memory devices 1600*a* and 1600*b* or audio data included in a content received from an external device through a model 1400, input/output devices 1700*a* and 1700*b*, or the like. For example, the audio processing unit 1300 may perform various processing such as coding/decoding, amplification, noise filtering, and the like on audio data.

The modem 1400 may modulate and transmit a signal to transmit/receive wired/wireless data, while recovering an original signal by demodulating a signal received from the outside. The input/output devices 1700*a* and 1700*b* are devices providing a digital input/output, and may include a port that can be connected to an external recording medium, an input device such as a touch screen, a mechanical button key, or the like, an output device capable of outputting vibrations through a method such as haptic, and the like. In some examples, the input/output devices 1700*a* and 1700*b* may be connected to an external recording medium through ports such as USB, a lightning cable, an SD card, a micro SD card, a DVD, a network adapter, or the like.

The AP 1800 may control an overall operation of the mobile system 1000. Specifically, the AP 1800 may control the display 1200 so that a portion of contents stored in the flash memory devices 1600*a* and 1600*b* is displayed on a screen. In addition, when a user input is received through the input/output devices 1700*a* and 1700*b*, the AP 1800 may perform a control operation corresponding to the user input.

The AP 1800 may be provided as a system-on-chip (SoC) driving an application program, an operating system (OS), and the like. In addition, the AP 1800 may also be included in one semiconductor package with other devices included in the mobile system 1000, for example, the DRAM 1500*a*, the flash memory 1620 and/or the memory controller 1610. For example, at least one device, different from the AP 1800 may be provided in a form of packages such as Package on Package (PoP), Ball grid arrays(BGAs), Chip Scale Packages(CSPs), System In Package(SIP), Multi Chip Package (MCP), Wafer-level Fabricated Package(WFP), Wafer-level processed Stack Package(WSP), or the like. An input/output scheduler or a device driver for controlling the flash memory devices 1600*a* and 1600*b* may be included in a kernel of the operating system driven on the AP 1800. The device driver may control an access performance of flash memory devices 1600*a* and 1600*b* by referring the number of sync queues managed by an input/output scheduler, or may control a CPU mode inside the SoC, a dynamic voltage and frequency scaling (DVFS), and the like.

In an example embodiment, the AP 1800 may include a processor block executing an operation, or driving an application program and/or an operating system, and various other peripheral components connected to the processor block through a system bus. Peripheral components may include a memory controller, an internal memory, a power management block, an error detection block, a monitoring block, and the like. The processor block may include one or more cores, and when a plurality of cores are included in the processor block, each of the cores may include a cache memory, and a common cache shared by the cores may be included in the processor block.

In an example embodiment, the AP 1800 may also include an accelerator block 1820, which is a dedicated circuit for AI data operation. Alternatively, according to example embodiments, a separate accelerator chip may be provided separately from the AP 1800, and a DRAM 1500*b* may be additionally connected to the accelerator block 1820 or an accelerator chip. The accelerator block 1820 is a function block that specializes in performing a specific function of the AP 1800, and may include a graphs processing unit (GPU), which is a function block that specializes in performing graphic data processing, a neural processing unit (NPU), which is a block that specializes in performing an AI calculation and inference, a data processing unit (DPU), which is a block that specializes in performing data transmission, and the like.

According to an example embodiment, the mobile system 1000 may include a plurality of DRAMs 1500*a* and 1500*b*. In an example embodiment, the AP 1800 may include a controller 1810 for controlling the DRAMs 1500*a* and 1500*b*, and the DRAM 1500*a* may be directly connected to the AP 1800.

The AP 1800 may control DRAM by setting a command and a mode register set (MRS) conforming to a JEDEC standard, or it is possible to communicate by setting the specifications and functions required by the mobile system 1000 such as low voltage/high speed/reliability, and DRAM interface protocols for CRC/ECC. For example, the AP 1800 may communicate with a DRAM 1500*a* through an interface conforming to the JEDEC standard such as LPDDR4 LPDDR5, or the like. Alternatively, the AP 1800 may also communicate by setting a new DRAM interface protocol to control a DRAM 1500*b* for an accelerator in which an accelerator block 1820 or an accelerator chip provided separately from the AP 1800 has a higher bandwidth than the DRAM 1500*a*.

Although only DRAMs 1500*a* and 1500*b* are illustrated in FIG. 12, a configuration of a mobile system 1000 is not necessarily limited to this type, and memories other than the DRAM 1500a and 1500b may be included in the mobile system 1000 according to a bandwidth, a reaction speed, voltage conditions of the AP 1800, or an accelerator block 1820. For example, the controller 1810 and/or the accelerator block 1820 may control various memories such as PRAM, SRAM, MRAM, RRAM, FRAM, hybrid RAM, and the like. The DRAMs 1500a and 1500b have relatively lower latency and higher bandwidth than the input/output devices 1700a and 1700b or the flash memory devices 1600a and 1600b. The DRAMs 1500a and 1500b may be initialized when the mobile system 1000 is powered on, and if an operating system and application data are loaded, the DRAMs 1500a and 1500b may be used as a temporary storage location for the application data or an execution space for various software codes.

In the DRAMs 1500a and 1500b, add/subtract/multiply/divide four arithmetic operations, vector operations, address operations, or FFT operation data may be stored. In another example embodiment, the DRAMs 1500a and 1500b may be provided as a processing in memory (PIM) equipped with an arithmetic function. For example, a function for performing an inference used in the DRAM 1500a and 1500b may be performed. Here, the inference may be performed in a deep learning algorithm using an artificial neural network. The deep learning algorithm may include a training step learning a model through various data and an inference step of recognizing data with the trained model. For example, the function used for the inference may include a hyperbolic tangent function, a sigmoid function, a rectified linear unit (ReLU) function, and the like.

As an example embodiment, an image captured by a user through the camera 1100 may be signal-processed and stored in the DRAM 1500b, and the accelerator block 1820 or the accelerator chip may perform an AI data operation recognizing by using data stored in the DRAM 1500b and a function used for the inference.

Depending on the example embodiment, the mobile system 1000 may include a plurality of storages or a plurality of flash memory devices 1600a and 1600b having a capacity, greater than that of the DRAMs 1500a and 1500b. The flash memory devices 1600a and 1600b may include a controller 1610 and a flash memory 1620. The controller 1610 may receive a control command data from the AP 1800, and write data to the flash memory 1620 in response to the control command, or read data stored in the flash memory 1620 to be transmitted to the AP 1800.

According to an example embodiment, the accelerator block 1820 or the accelerator chip may perform a training step and an AI data operation using the flash memory devices 1600a and 1600b. In an example embodiment, an operation logic capable of executing a predetermined operation inside the flash memory devices 1600a and 1600b may be implemented in the controller 1610, and the operation logic may also instead execute at least a portion a training step and an inference AI data operation performed by the AP 1800 and/or the accelerator block 1820 using data stored in the flash memory 1620.

In an example embodiment, the AP 1800 may include an interface 1830, and accordingly, the flash memory devices 1600a and 1600b may be directly connected to the AP 1800. For example, the AP 1800 may be implemented as an SoC, the flash memory device 1600a may be implemented as a separate chip different from the AP 1800, and the AP 1800 and the flash memory device 1600a can be mounted in one package. However, the present inventive concepts are not limited thereto, and a plurality of flash memory devices 1600a and 1600b may be electrically connected to the mobile system 1000 through a connection.

The flash memory devices 1600a and 1600b may store data such as still images/movies captured by the camera 1100, or store data received through a communication network and/or a port included in input/output device 1700a and 1700b. For example, the flash memory devices 1600a and 1600b may store Augmented Reality/Virtual Reality, High Definition (HD), or Ultra High Definition (UHD) content.

As set forth above, according to an example embodiment of the present inventive concepts, a DC-DC converter may include a feed forward circuit instead of a voltage-controlled delay line having a relatively high gain. Meanwhile, the feed forward circuit, the voltage controlled oscillator, and the voltage controlled delay line having a relatively small gain may operate as a compensation circuit. Accordingly, a delay of an entire compensation circuit can be reduced and transient response characteristics can be improved.

Various and advantageous advantages and effects of the present inventive concepts are not limited to the above description, as will be readily understood from the above example embodiments of the present inventive concepts.

One or more of the elements disclosed above may include or be implemented in one or more processing circuitries such as hardware including logic circuits; a hardware/software combination such as a processor executing software; or a combination thereof. For example, the processing circuitries more specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc.

While the example embodiments have been illustrated and described above, it will be apparent to those skilled in the art that modifications and variations could be made without departing from the scope of the present disclosure, as defined by the appended claims.

What is claimed is:
1. A DC-DC converter, comprising:
a switching buck regulator including a first power switch connected to a first power node for outputting a first power voltage, a second power switch connected to a second power node for outputting a second power voltage lower than the first power voltage, a driver configured to drive the first power switch and the second power switch, an output filtering inductor connected to a node between the first power switch and the second power switch, and an output filtering capacitor connected to the output filtering inductor;
a controller configured to compensate for an output signal of the switching buck regulator in a time domain using a reference voltage; and
a circuit connected between the switching buck regulator and the controller, the circuit including a first buffer, an RC filter, a second buffer, and an adder sequentially on a path,
wherein an input terminal of the first buffer is connected to an output terminal of the switching buck regulator and the adder, and an output terminal of the first buffer is connected to the RC filter, and
an input terminal of the second buffer is connected to the RC filter and the controller, and an output terminal of the second buffer is connected to the adder.

2. The DC-DC converter of claim 1, further comprising:
a voltage divider connected between the switching buck regulator and the circuit.

3. The DC-DC converter of claim 2, wherein
the voltage divider comprises a plurality of resistors, and the voltage divider is configured to determine a gain thereof based on the reference voltage.

4. The DC-DC converter of claim 1, wherein the RC filter comprises:
a compensation filtering capacitor connected to the output terminal of the first buffer and the input terminal of the second buffer; and
a compensation filtering resistor connected to the compensation filtering capacitor and the input terminal of the second buffer.

5. The DC-DC converter of claim 4, wherein the reference voltage is applied to the compensation filtering resistor.

6. The DC-DC converter of claim 1, wherein the first buffer has a first gain, and the second buffer has a second gain.

7. The DC-DC converter of claim 1, wherein
the controller comprises a first voltage controlled oscillator, a second voltage controlled oscillator, a voltage controlled delay line, and a phase detector,
wherein the phase detector is connected to the voltage controlled delay line connected to the first voltage controlled oscillator through a first path, and connected to the second voltage controlled oscillator through a second path separate from the first path.

8. The DC-DC converter of claim 7, wherein the RC filter is connected to the voltage controlled delay line.

9. The DC-DC converter of claim 1, wherein
the controller comprises a phase detector connected to a first voltage controlled oscillator and a second voltage controlled oscillator,
wherein the first voltage controlled oscillator is connected to the node between the first power switch and the second power switch.

10. A DC-DC converter, comprising:
a switching buck regulator including a driver and configured to output a first output signal, the driver configured to drive a first power switch and a second power switch;
a circuit connected to the switching buck regulator and including an adder, the circuit configured to generate a second output signal by performing a first operation on the first output signal, and output the first output signal and the second output signal using the adder; and
a controller connected to the adder, the controller including a first voltage controlled oscillator configured to receive the first output signal and the second output signal from the adder, a second voltage controlled oscillator configured to receive a reference voltage, a voltage controlled delay line, and a phase detector, the phase detector connected to the voltage controlled delay line that is connected to the first voltage controlled oscillator through a first path and connected to the second voltage controlled oscillator through a second path separate from the first path,
wherein the controller is configured to convert the first output signal and the second output signal into a time domain, perform a second operation on the converted first output signal and the converted second output signal, and perform a third operation to compensate for on a signal on which the second operation has been performed.

11. The DC-DC converter of claim 10, wherein
the first voltage controlled oscillator is configured to perform the second operation,
the voltage controlled delay line is configured to perform the third operation.

12. The DC-DC converter of claim 10, wherein
the voltage controlled delay line is configured to generate a reset voltage,
the second voltage controlled oscillator is configured to generate a set voltage, and
the phase detector is configured to detect a phase difference between the set voltage and the reset voltage to generate a driving signal.

13. The DC-DC converter of claim 12, wherein the driver is configured to output a switching signal for driving the first power switch and the second power switch based on the driving signal.

14. The DC-DC converter of claim 10, wherein
the first operation and the third operation are differential operations, and
the second operation is an integral operation.

15. The DC-DC converter of claim 10, wherein
the DC-DC converter is configured to,
output a first voltage before a driving signal is applied to the switching buck regulator,
output a second voltage that is a target voltage after the driving signal is applied, and
determine a time taken to output the second voltage after the driving signal is applied based on a gain of the voltage controlled delay line.

16. The DC-DC converter of claim 10, wherein the circuit compensates for the first output signal based on disturbance for the first output signal.

17. The DC-DC converter of claim 10, wherein the voltage controlled delay line is configured to reduce an overshoot when an output signal of the first voltage controlled oscillator abruptly changes.

18. A DC-DC converter, comprising:
a switching buck regulator including a driver configured to output a switching signal for driving a first power switch and a second power switch based on a driving signal, the switching buck regulator configured to output a first output signal;
a circuit connected to the switching buck regulator, the circuit including a first buffer, an RC filter, a second buffer, and an adder sequentially on a path, the circuit configured to output the first output signal together with a second output signal using the adder; and
a controller including a voltage controlled delay line connected to a first voltage controlled oscillator and a phase detector connected to a second voltage controlled oscillator, the controller configured to convert the first output signal and the second output signal into a time domain, and generate the driving signal based on at least one of the converted first output signal or the converted second output signal.

19. The DC-DC converter of claim 18, further comprising:
a plurality of regulators corresponding to the switching buck regulator,
wherein the controller is configured to generate a plurality of driving signals, which include the driving signal, corresponding to the plurality of regulators, and
a plurality of drivers included in the plurality of regulators are configured to output a plurality of switching signals based on the plurality of driving signals.

* * * * *